(12) United States Patent
Iwamoto

(10) Patent No.: US 12,248,498 B2
(45) Date of Patent: Mar. 11, 2025

(54) INFORMATION PROCESSING DEVICE, INFORMATION PROCESSING METHOD, STORAGE MEDIUM ON WHICH AN INFORMATION PROCESSING PROGRAM IS STORED, AND VEHICLE

(71) Applicants: TOYOTA JIDOSHA KABUSHIKI KAISHA, Toyota (JP); DENSO CORPORATION, Kariya (JP)

(72) Inventor: Jun Iwamoto, Nisshin (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 0 days.

(21) Appl. No.: 18/153,443

(22) Filed: Jan. 12, 2023

(65) Prior Publication Data

US 2023/0229678 A1 Jul. 20, 2023

(30) Foreign Application Priority Data

Jan. 17, 2022 (JP) ................................ 2022-005361

(51) Int. Cl.
*G06F 7/00* (2006.01)
*G06F 16/2455* (2019.01)
*G06F 16/248* (2019.01)
*G06F 16/28* (2019.01)

(52) U.S. Cl.
CPC ........ *G06F 16/289* (2019.01); *G06F 16/2455* (2019.01); *G06F 16/248* (2019.01)

(58) Field of Classification Search
CPC .. G06F 16/289; G06F 16/2455; G06F 16/248; G06F 21/62; G06F 3/0605; G06F 3/0644; G06F 3/0655
See application file for complete search history.

(56) References Cited

U.S. PATENT DOCUMENTS

| | | | |
|---|---|---|---|
| 7,249,314 B2 * | 7/2007 | Walker | G06F 21/6227 715/255 |
| 8,396,800 B1 * | 3/2013 | Wieder | H04L 63/0807 705/50 |
| 9,652,927 B2 * | 5/2017 | Sadamoto | G07F 17/32 |
| 10,372,411 B2 * | 8/2019 | Panguluri | H04L 67/12 |
| 10,692,371 B1 * | 6/2020 | Nix | G08G 1/127 |
| 2005/0192929 A1 | 9/2005 | Sumi | |
| 2006/0224716 A1 * | 10/2006 | Nakazawa | H04L 67/564 707/E17.11 |

(Continued)

FOREIGN PATENT DOCUMENTS

JP 2005301985 A 10/2005
JP 2008077220 A 4/2008

*Primary Examiner* — Mohammed R Uddin
(74) *Attorney, Agent, or Firm* — Dickinson Wright, PLLC

(57) ABSTRACT

An information processing device receives a request signal, read out a user class or a storage region class from a memory, based on which user class and storage region class the request signal requests, and generates an object corresponding to the read-out class, wherein each user class is a class relating to users and each storage region class is a class relating to storage regions utilized by the users, based on the generated object and the request signal. The information processing device executes a method corresponding to the object, and thereby acquire data corresponding to the request signal. The information processing device outputs the acquired data.

7 Claims, 6 Drawing Sheets

(56) References Cited

U.S. PATENT DOCUMENTS

| | | | | |
|---|---|---|---|---|
| 2013/0124974 A1* | 5/2013 | Song | ................. | G06F 40/10 |
| | | | | 715/234 |
| 2016/0352712 A1* | 12/2016 | Tamp | ................. | G06F 21/6245 |
| 2017/0230702 A1* | 8/2017 | Sarosi | ................. | H04N 21/4135 |
| 2018/0239349 A1* | 8/2018 | Rasmussen | ................. | G01C 21/3415 |
| 2019/0303021 A1* | 10/2019 | Favre-Felix | ................. | G06F 3/0617 |
| 2020/0126000 A1* | 4/2020 | Kim | ................. | G07C 5/008 |
| 2021/0312724 A1* | 10/2021 | Petri | ................. | H04W 4/40 |
| 2024/0037129 A1* | 2/2024 | Sudo | ................. | G06F 40/151 |

\* cited by examiner

INFORMATION PROCESSING DEVICE, INFORMATION PROCESSING METHOD, STORAGE MEDIUM ON WHICH AN INFORMATION PROCESSING PROGRAM IS STORED, AND VEHICLE

CROSS-REFERENCE TO RELATED APPLICATION

This application is based on and claims priority under 35 USC 119 from Japanese Patent Application No. 2022-005361 filed on Jan. 17, 2022, the disclosure of which is incorporated by reference herein.

BACKGROUND

Technical Field

The present disclosure relates to an information processing device, an information processing method, a storage medium on which an information processing program is stored, and a vehicle.

Related Art

There is conventionally known an object-oriented control system for a vehicle that, even in a case in which a design change is made to a storage medium, can keep the effects thereof on applications and data to a minimum (for example, Japanese Patent Application Laid-Open (JP-A) No. 2008-077220). JP-A No. 2008-077220 discloses the point of incorporating a method, which converts data into corresponding persistent data that is a stored form of the data, into a corresponding persistent data converting class (refer to the "Abstract" for example).

Further, an information processing system is known that can efficiently carry out specification changes of an object (for example, JP-A No. 2005-301985). The information processing device of JP-A No. 2005-301985 sets attribute information, which corresponds to the form of a predetermined object that is generated, in that predetermined object on the basis of first definition information (refer to the "Abstract" for example).

When a given system is utilized by plural users, there are cases in which the system stores the data that is utilized by the users. In such a case, because the system must ensure a storage region for each user, there is a strong possibility that the system will become complex. Therefore, it is preferable that the system be a system that, for example, takes the relationships between users and storage regions into consideration.

The technique of JP-A No. 2008-077220 is a technique that incorporates a method, which converts data to corresponding persistent data, into a corresponding persistent data converting class. However, the technique of JP-A No. 2008-077220 does not take the relationships between the users and the storage regions into consideration. Further, the technique of JP-A No. 2005-301985 as well does not take the relationships between the users and the storage regions into consideration.

Therefore, in the related art, there is the problem that, when a system is utilized by plural users, and the data utilized by the users is stored in the system, processing that takes the relationships between the users and storage regions into consideration cannot be executed.

The present disclosure was made in view of the above-described circumstances, and an object thereof is to, in cases in which a system is utilized by plural users, and the data utilized by the users is stored in the system, execute processing that takes the relationships between the users and storage regions into consideration.

SUMMARY

A first aspect of the present disclosure is an information processing device including: a receiving section receiving a request signal; a generating section that, read out a user class or a storage region class from the memory, based on which user class and storage region class the request signal requests, and generate an object corresponding to the read-out class, wherein each user class is a class relating to users and each storage region class is a class relating to storage regions utilized by the users a data acquiring section that, based on the object generated by the generating section and the request signal, executes a method corresponding to the object, and thereby acquires data corresponding to the request signal; and an outputting section outputting the data acquired by the data acquiring section.

The information processing device of the first aspect of the present disclosure receives a request signal, and, on the basis of which of a user class, which is a class relating to users, and a storage region class, which is a class relating to storage regions utilized by the users, the received request signal is a request signal for, reads-out the user class or the storage region class from a storing section, and generates an object corresponding to the read-out class. On the basis of the generated object and the request signal, the information processing device executes a method corresponding to the object, and thereby acquires data corresponding to the request signal. Then, the information processing device outputs the acquired data. Due thereto, in a case in which plural users utilize a system, and data utilized by the users is stored in the system, processing that takes the relationships between the users and the storage regions into consideration can be executed.

In a second aspect of the present disclosure, the user class is a class includes, as attribute information, information relating to the users, and includes, as methods, processing relating to the users, and the storage region class is a class includes, as attribute information, information relating to the storage regions, and includes, as methods, processing relating to the storage regions. In accordance with the second aspect of the present disclosure, the attribute information and the methods relating to the users, and the attribute information and the methods relating to the storage regions, are separate, and processing that takes the relationships between the users and the storage regions into consideration can be executed appropriately.

A user group class that manages the user class, and that includes, as attribute information, information relating to a at least some of the users, and includes, as methods, processing relating to the at least some of the users, and a storage region group class that manages the storage region class, and that includes, as attribute information, information relating to at least some of the storage regions, and includes, as methods, processing relating to the at least some of storage regions, are further stored in the storing section of a third aspect of the present disclosure, and, in a case in which the request signal requests the user group class, the generating section judges that the request signal requests the user class, and, in a case in which the request signal requests the storage region group class, the generating section determines that the request signal requests the storage region class. In accordance with the third aspect of the present disclosure, the attribute information and the methods relating to the user group, and the attribute information and the methods relating to the storage region group, are separate, and processing that takes the relationships between the user group and the storage region group into consideration can be executed appropriately.

A file class, which is a class including, as attribute information, information relating to files stored in the storage regions, and including, as methods, processing relating to the files, is further stored in the storing section of a fourth aspect of the present disclosure, and the generating section further determines whether or not the request signal requests the file class, and, in a case in which it is indicated that the request signal requests the file class, the generating section generates an object corresponding to the file class. In accordance with the fourth aspect of the present disclosure, the attribute information and the methods relating to files, and other attribute information and methods, are separate, and processing that takes the relationships between the file class and the other classes into consideration can be executed appropriately.

A fifth aspect of the present disclosure is a vehicle that is equipped with the above-described information processing device. In accordance with the fifth aspect of the present disclosure, in a case in which the vehicle is utilized by plural users, and data utilized by the users is stored in the information processing device of the vehicle, processing that takes the relationships between the users and storage regions into consideration can be executed.

An information processing method of a sixth aspect of the present disclosure is an information processing method in which a computer executes processing of: receiving a request signal; read out a user class or a storage region class from a memory, based on which user class and storage region class the request signal requests, and generate an object corresponding to the read-out class, wherein each user class is a class relating to users and each storage region class is a class relating to storage regions utilized by the users; based on the generated object and the request signal, executing a method corresponding to the object, and thereby acquiring data corresponding to the request signal; and outputting the acquired data. In accordance with the sixth aspect of the present disclosure, in the same way as in the first aspect, in a case in which plural users utilize a system, and data utilized by the users is stored in the system, processing that takes the relationships between the users and storage regions into consideration can be executed.

An information processing program of a seventh aspect of the present disclosure is an information processing program for causing a computer to execute processing of: receiving a request signal; reading out a user class or a storage region class from a memory, based on which user class and storage region class the request signal requests, and generating an object corresponding to the read-out class, wherein each user class is a class relating to users and each storage region class is a class relating to storage regions utilized by the users; based on the generated object and the request signal, executing a method corresponding to the object, and thereby acquiring data corresponding to the request signal; and outputting the acquired data. In accordance with the seventh aspect of the present disclosure, in the same way as in the first aspect, in a case in which plural users utilize a system, and data utilized by the users is stored in the system, processing that takes the relationships between the users and storage regions into consideration can be executed.

As described above, in accordance with the present disclosure, there is the effect that, in a case in which plural users utilize a system, and data utilized by the users is stored in the system, processing that takes the relationships between the users and storage regions into consideration can be executed.

DETAILED DESCRIPTION

An embodiment of the present disclosure is described in detail hereinafter with reference to the drawings.

Embodiment

Figure 1:
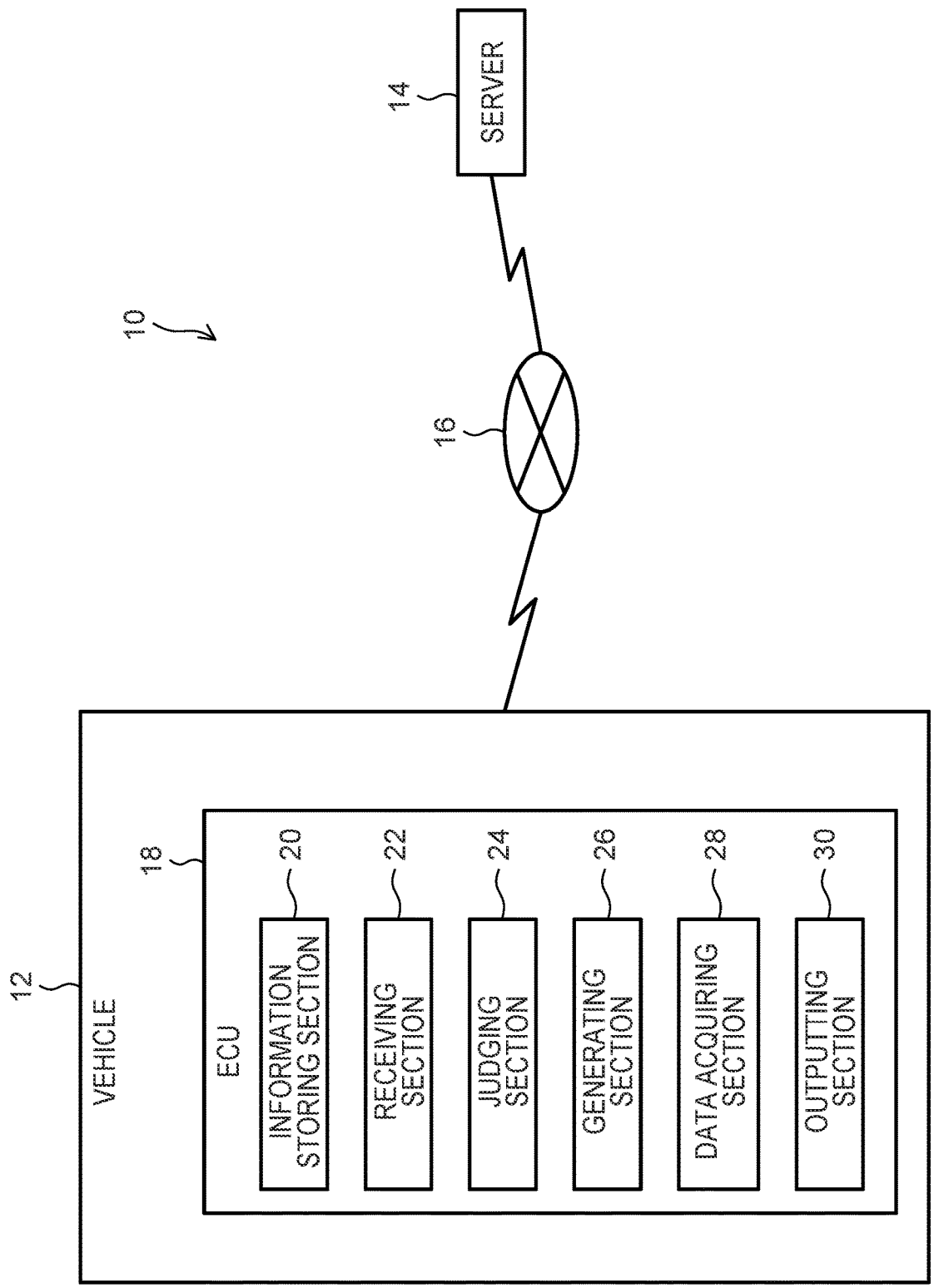
FIG. 1 is a block drawing illustrating an example of functional structures of an information processing system relating to an embodiment.

FIG. 1 is a block drawing illustrating an example of functional structures of an information processing system 10 relating to the embodiment. As illustrated in FIG. 1, the information processing system 10 has a vehicle 12 and a server 14. The vehicle 12 and the server 14 are connected so as to be able to communicate through a predetermined communication network 16.

An ECU (Electronic Control Unit) 18 that is an example of the information processing device is installed in the vehicle 12. As illustrated in FIG. 1, the ECU 18 has an information storing section 20, a receiving section 22, a judging section 24, a generating section 26, a data acquiring section 28 and an outputting section 30.

There are cases in which the vehicle 12 is utilized by plural users. Further, also at times when the ECU 18 of the vehicle 12 and the server 14 cooperate, there are cases in which the vehicle 12 is utilized by plural users through the server 14. For example, when plural users listen to music respectively, there are cases in which the music data or data related thereto or the like are stored in the storing section (not illustrated) of the ECU 18 of the vehicle 12. In addition, cases in which various types of data are stored in the storing section (not illustrated) of the ECU 18 per user can also be envisaged. In such cases, the ECU 18 must ensure a storage region per user, and there is the strong possibility that the structure of the ECU 18 will become complex.

Thus, in the present embodiment, classes are divided into user classes, which are classes relating to users of the vehicle 12, and storage region classes, which are classes relating to storage regions utilized by those users. Due thereto, in a case in which the vehicle 12 is utilized by plural users, and the data utilized by the users is stored in the ECU 18 of the vehicle 12, processing that takes the relationships between the users and the storage regions into consideration is executed. Specifically, even in cases in which a design change due to the addition of a user or a change in the storage capacity or the like arises, the scale of that change can be reduced. Specifics are described hereinafter.

The data structure corresponding to a user group class, the data structure corresponding to a user class, the data structure corresponding to a storage region group class, the data structure corresponding to a storage region class, and the data structure corresponding to a file class are respectively stored in the information storing section 20. These respective classes are classes in an object-oriented program.

Figure 2:
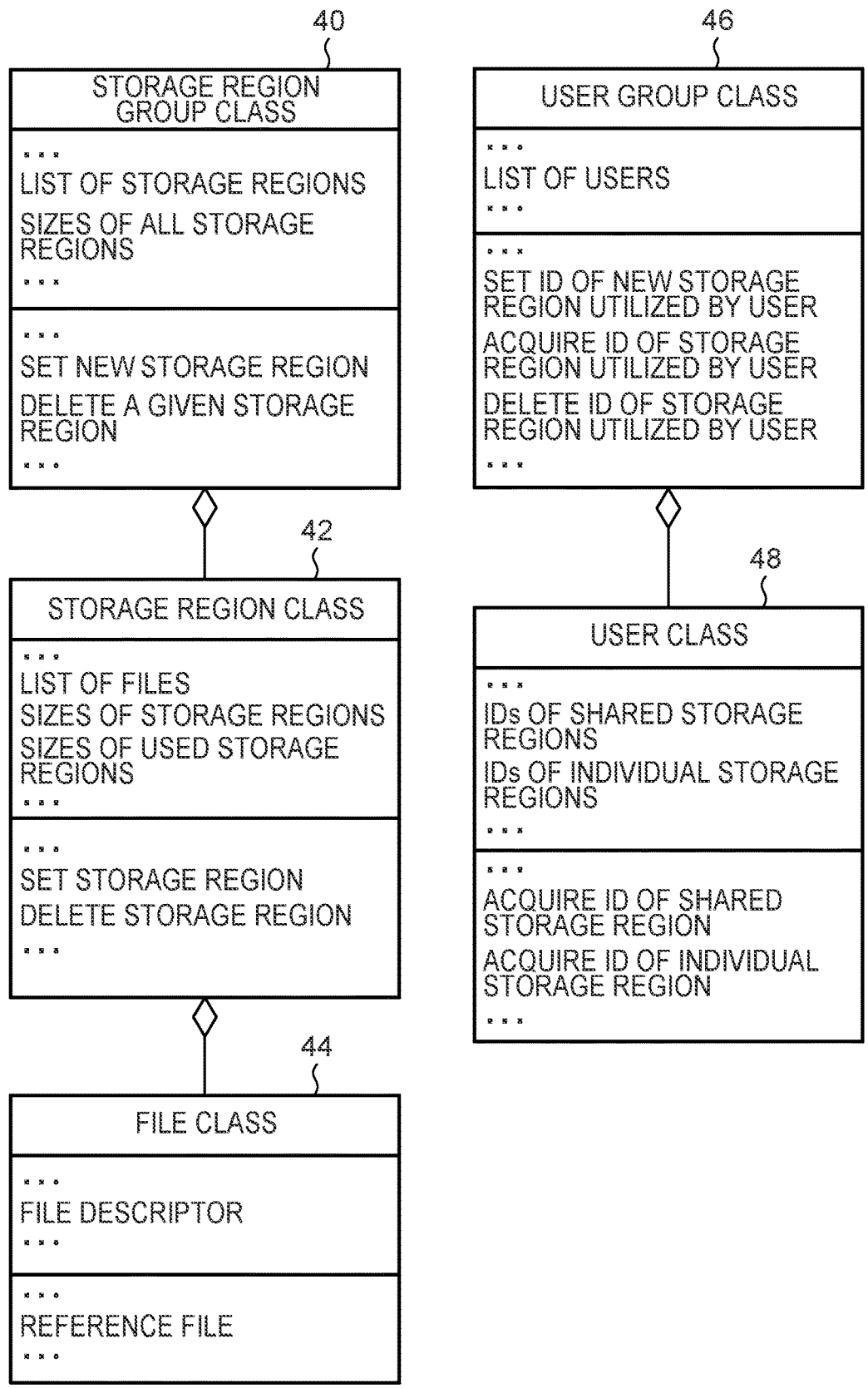
FIG. 2 is a drawing for explaining examples of classes.

FIG. 2 is a drawing for explaining the respective classes.

As illustrated in FIG. 2, storage region group class 40 is a class that manages a storage region class 42. The storage region group class 40 has attribute information relating to plural storage regions, and has, as methods, processings relating to the plural storage regions. For example, the storage region group class 40 has, as attribute information, information relating to the plural storage regions that is a list of the storage regions and the sizes of all of the storage regions. Further, the storage region group class 40 has, as methods, processings relating to the plural storage regions that are the setting of a new storage region and the deletion of a given storage region.

As illustrated in FIG. 2, the storage region class 42 is a class that manages a file class 44. The storage region class 42 has information relating to the storage regions as attribute information, and has, as methods, processings relating to the storage regions. For example, the storage region class 42 has, as attribute information, information relating to the plural storage regions that is a list of the files stored in the storage regions and the sizes of the storage regions. Further, the storage region class 42 has, as methods, processings relating to the plural storage regions that are the setting of a storage region and the deletion of a storage region.

As illustrated in FIG. 2, the file class 44 has, as attribute information, information relating to the files stored in the storage regions, and has, as methods, processings relating to the files. For example, the file class 44 has, as attribute information, information relating to the files such as the identifiers of the files. Further, the file class 44 has, as methods, processings relating to the files such as referencing the files.

As illustrated in FIG. 2, user group class 46 is a class that manages the user class. The user group class 46 has, as attribute information, information relating to plural users, and has, as methods, processings relating to the plural users. For example, the user group class 46 has, as attribute information, information relating to the plural users such as a list of the users. Further, the user group class 46 has, as methods, processings relating to the plural users that are setting of an ID of a new storage region utilized by a user, acquisition of the ID of a storage region utilized by a user, and deletion of the ID of a storage region utilized by a user.

As illustrated in FIG. 2, user class 48 has, as attribute information, information relating to the users, and has, as methods, processings relating to the users. For example, the user class 48 has, as attribute information, information relating to the users such as the IDs of storage regions shared by users and the IDs of individual storage regions of users. Further, the user class 48 has, as methods, processings relating to the users such as the acquisition of the IDs of the storage regions shared by users and the acquisition of the IDs of the individual storage regions of the users.

The receiving section 22 receives request signals outputted from predetermined application programs. For example, the receiving section 22 receives request signals that are outputted from application programs executed at the server 14.

On the basis of a request signal received by the receiving section 22, the judging section 24 judges whether that request signal is a request signal for the user group class 46 or for the storage region group class 40.

On the basis of the results of judgement obtained by the judging section 24, the generating section 26 reads-out the user group class 46 or the storage region group class 40 from the information storing section 20. Then, the generating section 26 generates an object corresponding to the read-out class. For example, in a case in which the request signal is a signal for the user class, and user ID "00001" is included in the request signal, the generating section 26 generates an object corresponding to the user ID "00001".

On the basis of the object generated by the generating section 26 and the request signal, the data acquiring section 28 executes the method corresponding to the object, and thereby acquires the data corresponding to the request signal.

Figure 3:
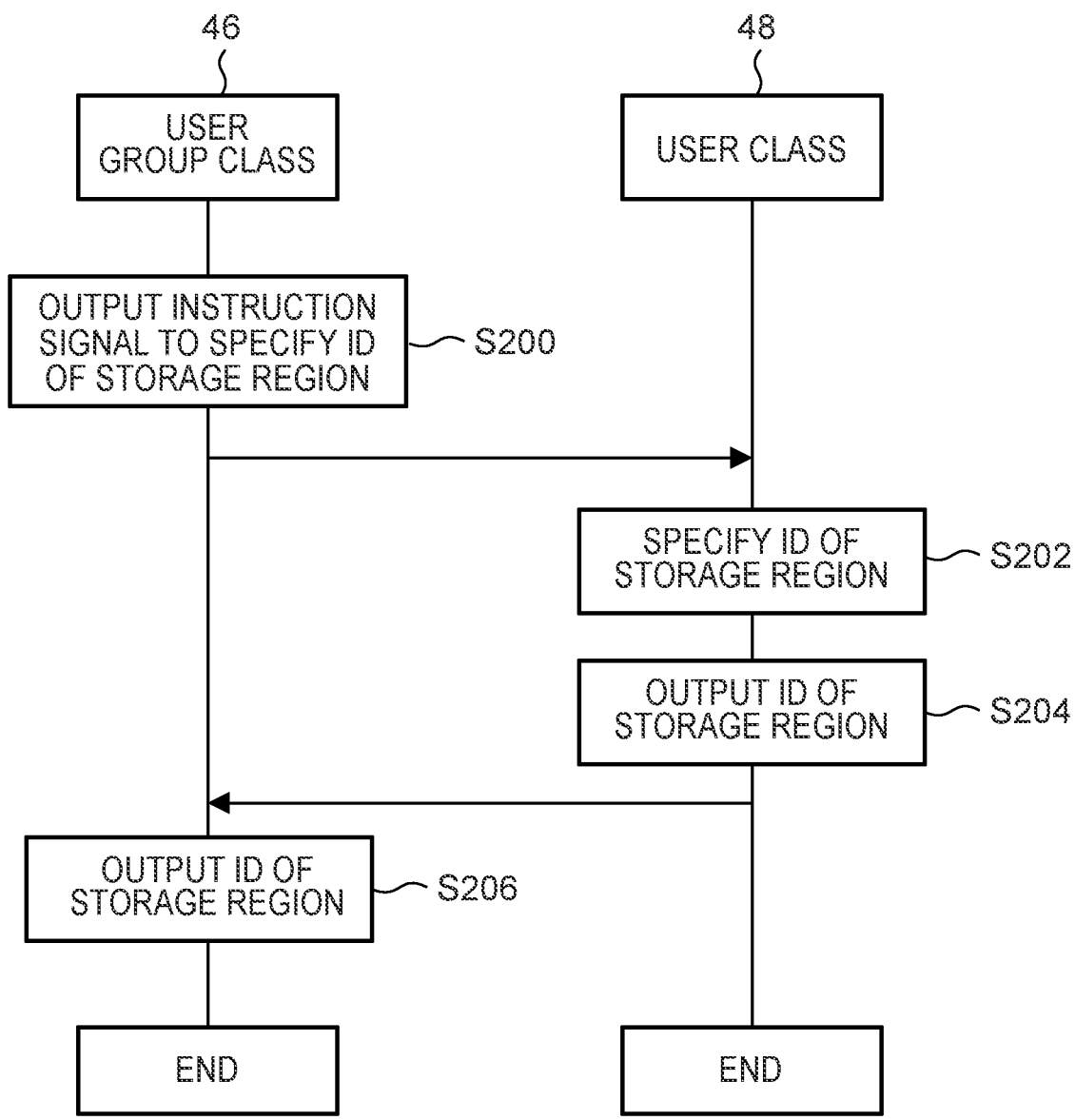
FIG. 3 is a drawing for explaining an example of execution of methods.
Figure 4:
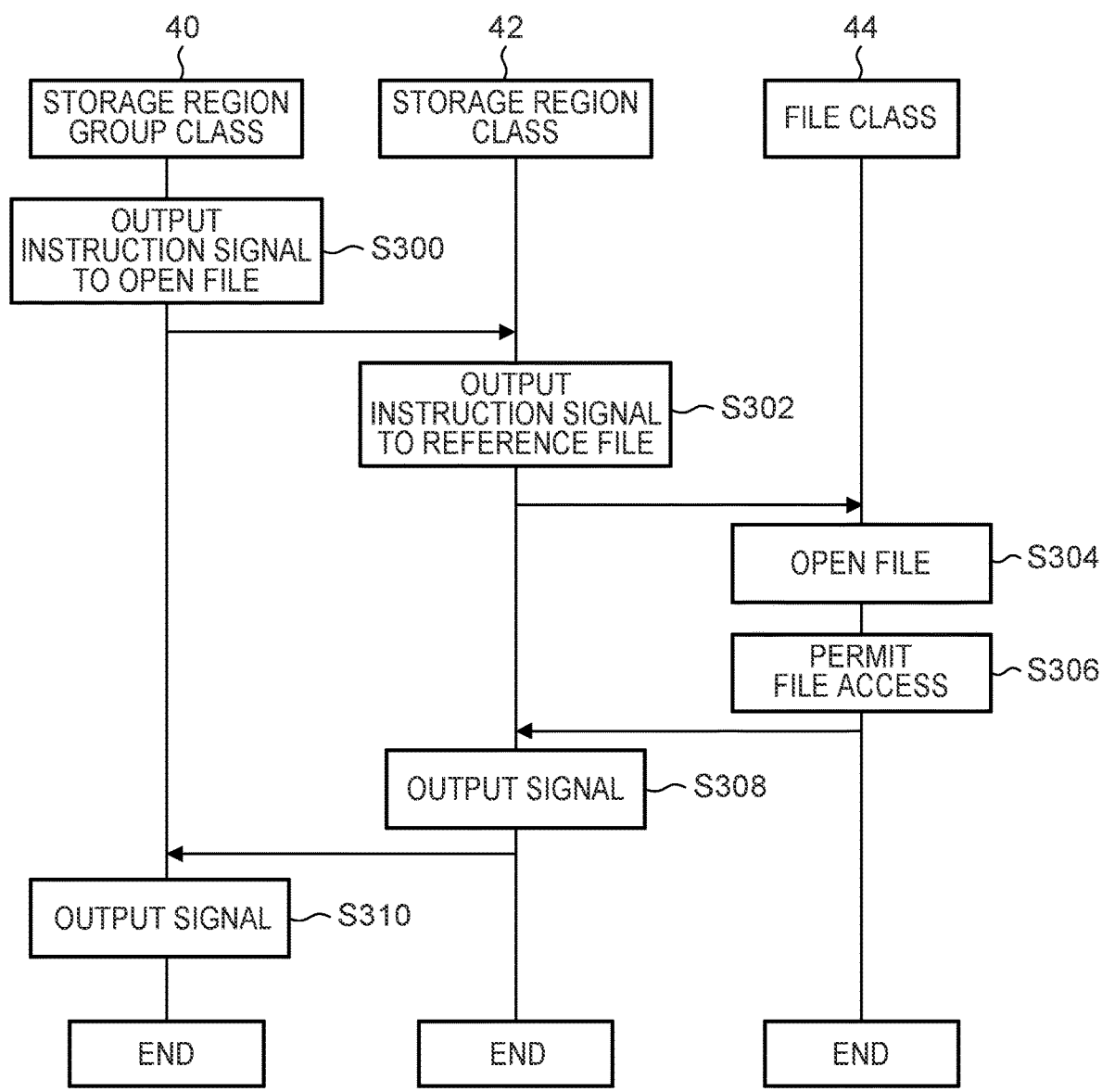
FIG. 4 is a drawing for explaining an example of execution of methods.

FIG. 3 and FIG. 4 are drawings for explaining execution of methods.

For example, in a case in which the request signal is a signal for the user group class 46, methods such as illustrated in FIG. 3 are executed. The example illustrated in FIG. 3 is an example of a case in which the request signal requests acquisition of the ID of the storage region of a user.

First, in step S200, an object corresponding to the user group class 46 is generated, and an instruction signal to specify the ID of the storage region of the user is outputted as the method thereof.

In step S202, an object corresponding to the user class 48 is generated, and the ID of the storage region of the user is specified as the method thereof.

In step S204, the ID of the storage region of that user is outputted from the object corresponding to the user class 48.

In step S206, the ID of the storage region of that user is outputted from the object corresponding to the user group class 46.

Further, for example, in a case in which the request signal is a signal for the storage region group class 40, methods such as illustrated in FIG. 4 are executed. The example illustrated in FIG. 4 is an example of a case in which the request signal requests opening of a predetermined file.

First, in step S300, an object corresponding to the storage region group class 40 is generated, and an instruction signal to open a predetermined file is outputted as the method thereof.

In step S302, an object corresponding to the storage region class 42 is generated, and an instruction signal to reference the predetermined file is outputted as the method thereof.

In step S304, an object corresponding to the file class 44 is generated, and the predetermined file is opened as the method thereof.

In step S306, a signal permitting access to that file is outputted from the object corresponding to the file class 44.

In step S308, a signal relating to an access pass to the file is outputted from the object corresponding to the storage region class 42.

In step S310, a signal relating to an access pass to the file is outputted from the object corresponding to the storage region group class 40.

In this way, by dividing the classes into classes relating to the users and classes relating to the storage regions, processings that take the relationships between the users and the storage regions into consideration are executed. Specifically, even in cases in which a design change due to the addition of a user or a change in the storage capacity or the like arises, the scope of that change can be reduced. Further, by making the processings relating to the users and the processings relating to the storage regions into modules respectively, it becomes clear how the respective classes should operate with respect to the other classes.

The outputting section 30 outputs, as results, the data acquired by the data acquiring section 28.

Figure 5:
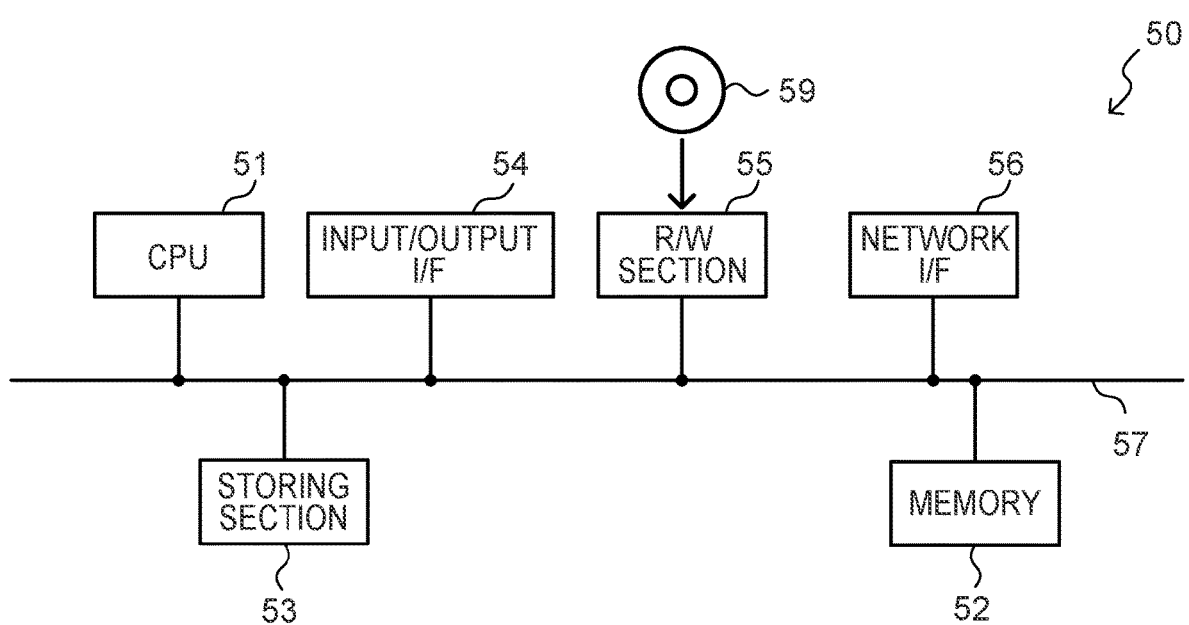
FIG. 5 is a drawing illustrating a structural example of a computer of respective devices relating to the embodiment.

The ECU 18 and the server 14 can be realized by a computer 50 such as illustrated in FIG. 5 for example. The computer 50 has a Central Processing Unit (CPU) 51, a memory 52 serving as a temporary storage region, and a non-volatile storing section 53. Further, the computer 50 has an input/output interface (I/F) 54 to which input/output devices and the like (not illustrated) are connected, and a read/write (R/W) section 55 that controls reading and writing of data from and to a recording medium 59. Moreover, the computer 50 has a network I/F 56 that is connected to a network such as the internet or the like. The CPU 51, the memory 52, the storing section 53, the input/output I/F 54, the R/W section 55 and the network I/F 56 are connected to one another via bus 57.

The storing section 53 can be realized by an HDD (Hard Disk Drive), a Solid State Drive (SSD), a flash memory, or the like. Programs for causing the computer 50 to function are stored in the storing section 53 that serves as a storage medium. The CPU 51 reads-out a program from the storing section 53, and expands the program in the memory 52, and successively executes the processes of the program.

Operation of the ECU 18 of the embodiment is described next.

Figure 6:
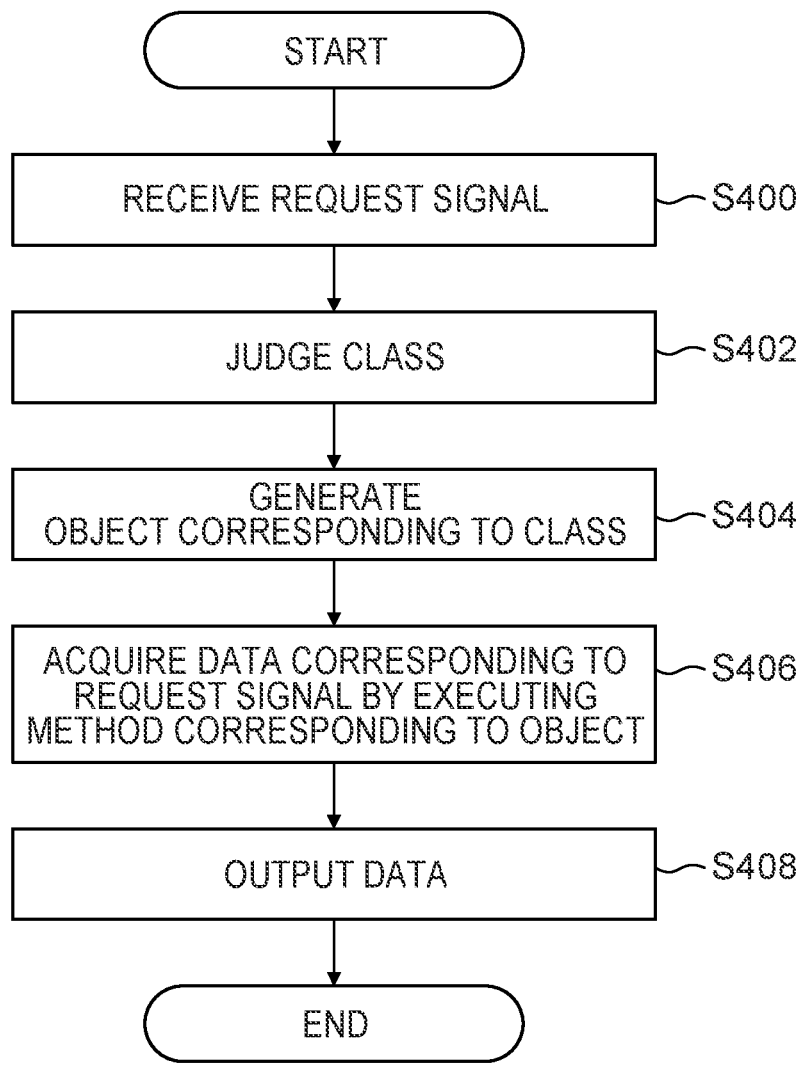
FIG. 6 is a drawing illustrating an example of the flow of processing executed at an ECU relating to the embodiment.

For example, a case is considered in which a user who rides in the vehicle 12 utilizes a given application program through the server 14. In this case, when the server 14 executes the given application program, that application program outputs a predetermined request signal to the ECU 18. When a request signal is outputted from the application program, the ECU 18 executes the processing routine illustrated in FIG. 6.

In step S400, the receiving section 22 receives the request signal.

In step S402, on the basis of the request signal received in step S400, the judging section 24 judges for which of the user group class 46 and the storage region group class 40 that request signal is. Note that cases in which the judging section 24 judges that the request signal is a request signal for the user group class 46 also include cases in which the request signal is judged to be a request signal for the user class 48. Further, cases in which the judging section 24 judges that the request signal is a request signal for the storage region group class 40 also include cases in which the request signal is judged to be a request signal for the storage region class 42.

In step S404, on the basis of the results of judgment obtained in above step S402, the generating section 26 reads-out the user group class 46 or the storage region group class 40 from the information storing section 20. Then, the generating section 26 generates an object corresponding to the read-out class.

In step S406, on the basis of the object generated in above step S404 and the request signal, the data acquiring section 28 acquires data corresponding to the request signal by executing the method corresponding to the object.

In step S408, the outputting section 30 outputs the data, which was acquired in step S406, as results.

As described above, the ECU relating to the embodiment receives a request signal, and, on the basis of the received request signal, judges which of the user class, which is a class relating to users, and the storage region class, which is a class relating to storage regions utilized by the users, the request signal is for. On the basis of the obtained results of judgment, the ECU reads-out the user class or the storage region class from the information storing section in which the user class and the storage region class are respectively stored, and generates an object corresponding to the read-out class. On the basis of the generated object and the request signal, the ECU executes a method corresponding to the object, and thereby acquires data corresponding to the request signal, and outputs the acquired data. Due thereto, in a case in which a system is utilized by plural users, and data utilized by the users is stored in the system, processings that take the relationships between the users and the storage regions into consideration can be executed. Further, even in a case in which a design change due to the addition of a user or a change in the storage capacity or the like arises, the scale of that change can be reduced. Further, by making the processings relating to the users and the processings relating to the storage regions into respective modules, it becomes clear how the respective classes should operate with respect to the other classes.

Note that the processings that are carried out at the respective devices in the above embodiment are described as software processings that are carried out by executing programs, but they may be processings caned out by hardware, or processings carried out by a combination of software and hardware. Further, the programs stored in the ROM may be stored on any of various storage media and distributed.

Moreover, the present disclosure is not limited to the above-described exemplary modes, and can, of course, be implemented by being modified in various ways other than the above exemplary modes, within a scope that does not depart from the gist of the present disclosure.

For example, the above embodiment describes, as an example a case in which the ECU 18 judges which of the user group class 46 and the storage region group class 40 the request signal is for. However, the present disclosure is not limited to this. For example, the ECU 18 may judge which of the user class 48 and the storage region class 42 the request signal is for. Due thereto, the predetermined processing can be executed without going through the user group class 46 or the storage region group class 40.

Further, the ECU 18 may further judge whether or not the request signal is a request signal for the file class 44. In this case, if it is indicated that the request signal is a request signal for the file class 44, the ECU 18 generates an object corresponding to the file class 44. Due thereto, the predetermined processing can be executed without going through the user group class 46, the user class 48, the storage region group class 40, and the storage region class 42.

All publications, patent applications, and technical standards mentioned in this specification are herein incorporated by reference to the same extent as if each individual publication, patent application, or technical standard was specifically and individually indicated to be incorporated by reference.

What is claimed is:

1. A vehicle comprising an information processing device comprising a memory, and a processor coupled to the memory, wherein the processor is configured to:
receive a request signal via an input/output interface;
judge whether the request signal is a request for a user class or a storage region class;
read out the user class or the storage region class from the memory, based on which user class and storage region class the request signal requests, and generate an object corresponding to the read-out class, wherein each user class is a class relating to vehicle users and each storage region class is a class relating to storage regions utilized by the vehicle users;
based on the generated object and the request signal, execute a method corresponding to the object;
when the request is for a user class, the method comprises obtaining an ID of a storage region of a vehicle user;
when the request is for a storage region class, the method comprises opening a predetermined file related to the vehicle user;
acquire data corresponding to the request signal by executing the method corresponding to the object; and
output the acquired data via the input/output interface.

2. The vehicle of claim 1, wherein:
the user class includes, as attribute information, information relating to the vehicle users, and includes, as methods, processing relating to the vehicle users, and
the storage region class includes, as attribute information, information relating to the storage regions, and includes, as methods, processing relating to the storage regions.

3. The vehicle of claim 1, wherein:
a user group class that manages the user class, and that includes, as attribute information, information relating to at least some of the vehicle users, and includes, as methods, processing relating to the at least some of the vehicle users, and
a storage region group class that manages the storage region class, and that includes, as attribute information, information relating to at least some of the storage regions, and includes, as methods, processing relating to the at least some of the storage regions,
are further stored in the memory, and
in a case in which the request signal requests the user group class, the processor determines that the request signal requests the user class, and, in a case in which the request signal requests the storage region group class, the processor determines that the request signal requests the storage region class.

4. The vehicle of claim 1, wherein:
a file class, which is a class including, as attribute information, information relating to files stored in the storage regions, and including, as methods, processing relating to the files, is further stored in the memory, and
the processor further determines whether or not the request signal requests the file class, and, in a case in which it is indicated that the request signal requests the file class, the processor generates an object corresponding to the file class.

5. The vehicle of claim 1, wherein:
the information processing device is installed in a vehicle,
the vehicle is used by a plurality of users,
the user class is associated with the user who uses the vehicle,
the storage region class is associated with a storage region included in the information processing device.

6. An information processing method performed by a vehicle in which a processor is configured to:
receive a request signal via an input/output interface;
judge whether the request signal is a request for a user class or a storage region class;
read out the user class or the storage region class from a memory, based on which user class and storage region class the request signal requests, and generate an object corresponding to the read-out class, wherein each user class is a class relating to vehicle users and each storage region class is a class relating to storage regions utilized by the vehicle users;
based on the generated object and the request signal, execute a method corresponding to the object;
when the request is for a user class, the method comprises obtaining an ID of a storage region of a vehicle user;
when the request is for a storage region class, the method comprises opening a predetermined file related to the vehicle user;
acquire data corresponding to the request signal by executing the method corresponding to the object; and
output the acquired data via the input/output interface.

7. A non-transitory storage medium of a vehicle storing an information processing program that is executable by a computer to perform processing, the processing comprising:
receiving a request signal via an input/output interface;
judge whether the request signal is a request for a user class or a storage region class;
reading out the user class or the storage region class from a memory, based on which user class and storage region class the request signal requests, and generating an object corresponding to the read-out class, wherein each user class is a class relating to vehicle users and each storage region class is a class relating to storage regions utilized by the vehicle users;
based on the generated object and the request signal, executing a method corresponding to the object;
when the request is for a user class, the method comprises obtaining an ID of a storage region of a vehicle user;
when the request is for a storage region class, the method comprises opening a predetermined file related to the vehicle user;
acquiring data corresponding to the request signal by executing the method corresponding to the object; and
outputting the acquired data via the input/output interface.

* * * * *